United States Patent
Sakai

(10) Patent No.: US 9,275,587 B2
(45) Date of Patent: Mar. 1, 2016

(54) ARRAY SUBSTRATE, DISPLAY DEVICE, LIQUID CRYSTAL PANEL, AND LIQUID CRYSTAL DISPLAY DEVICE

(75) Inventor: Tamotsu Sakai, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 159 days.

(21) Appl. No.: 14/111,266

(22) PCT Filed: May 17, 2012

(86) PCT No.: PCT/JP2012/062709
§ 371 (c)(1),
(2), (4) Date: Oct. 11, 2013

(87) PCT Pub. No.: WO2012/157724
PCT Pub. Date: Nov. 22, 2012

(65) Prior Publication Data
US 2014/0028644 A1    Jan. 30, 2014

(30) Foreign Application Priority Data
May 18, 2011   (JP) .................................. 2011-111908

(51) Int. Cl.
*G09G 3/36* (2006.01)
*G02F 1/1345* (2006.01)
*G02F 1/1362* (2006.01)
*G09G 3/20* (2006.01)
*G09G 3/34* (2006.01)

(52) U.S. Cl.
CPC ............... *G09G 3/36* (2013.01); *G02F 1/13452* (2013.01); *G02F 1/136286* (2013.01); *G09G 3/2074* (2013.01); *G09G 3/3655* (2013.01); *G09G 3/3666* (2013.01); *G09G 3/3406* (2013.01); *G09G 2300/0426* (2013.01); *G09G 2300/0443* (2013.01); *G09G 2300/0876* (2013.01); *G09G 2320/0646* (2013.01)

(58) Field of Classification Search
CPC .............. G02F 1/13452; G02F 1/1345; G02F 1/13458; G02F 1/13454; G09G 2300/0426

USPC ........ 345/87, 204, 103, 55, 98; 349/152, 149, 349/141, 143
See application file for complete search history.

(56) References Cited

U.S. PATENT DOCUMENTS

| | | | |
|---|---|---|---|
| 6,545,655 B1 * | 4/2003 | Fujikawa ............. | G09G 3/3611 345/103 |
| 2002/0071086 A1 * | 6/2002 | Kim et al. ...................... | 349/152 |
| 2004/0239586 A1 * | 12/2004 | Cok ...................... | G09G 3/3266 345/55 |

(Continued)

FOREIGN PATENT DOCUMENTS

| | | |
|---|---|---|
| JP | 3-70279 A | 3/1991 |
| JP | 4-190387 A | 7/1992 |

OTHER PUBLICATIONS

Official Communication issued in International Patent Application No. PCT/JP2012/062709, mailed on Jul. 17, 2012.

*Primary Examiner* — Koosha Sharifi-Tafreshi
(74) *Attorney, Agent, or Firm* — Keating & Bennett, LLP

(57) ABSTRACT

A liquid crystal panel LCP includes a first side and a second side which are adjacent to each other. This liquid crystal panel LCP includes: data signal lines Sa and Sb formed so as to extend in a direction parallel to the second side, and also so as to array in a direction perpendicular to the second side; a plurality of vertical-side source terminals f formed along the second side to which edge portions of the plurality of data signal lines Sa and Sb formed in a position on a closer side to the second side of the data signal lines Sa and Sb are each connected; and a plurality of horizontal-side source terminals F formed along the first side to which edge portions of the plurality of data signal lines Sa and Sb formed in a position on a farther side from the second side are each connected. Thus, higher definition can be handled.

5 Claims, 7 Drawing Sheets

(56) References Cited

U.S. PATENT DOCUMENTS

2005/0248556 A1* 11/2005 Yoshinaga ........ G02F 1/136286
345/204

2010/0309421 A1* 12/2010 Gotoh ............... G02F 1/136259
349/152
2011/0096258 A1* 4/2011 Shim ..................... G02F 1/1333
349/39

* cited by examiner

ARRAY SUBSTRATE, DISPLAY DEVICE, LIQUID CRYSTAL PANEL, AND LIQUID CRYSTAL DISPLAY DEVICE

TECHNICAL FIELD

The present invention relates to an array substrate to be used for a display device, a display device, a liquid crystal panel, and a liquid crystal display device.

BACKGROUND ART

In recent years, with display devices including liquid crystal display devices, increase in size and in definition of display panels has accelerated. With such display devices, high-speed driving is needed in which writing of image data as to pixels is performed over a short period of time. As a display device effective for this high-speed driving, display devices disclosed in PTL 1 and PTL 2, that is, display devices conforming to a so-called double source driving method have been known, for example.

Also, resolution of the current high definition television broadcast (High Definition television: HDTV) is horizontally 1920 pixels×vertically 1080 pixels (so-called 2K1K, hereinafter, this resolution will be referred to as full HD resolution). However, further, video standards for resolution 4 times that of full HD resolution (so-called 4K2K) or resolution 16 times that of full HD resolution (so-called 8K4K, Super Hi-Vision SHV also being one kind of such) have been proposed.

CITATION LIST

Patent Literature

PTL 1: Japanese Unexamined Patent Application Publication No. 3-70279 (disclosed on Mar. 26, 1991)
PTL 2: Japanese Unexamined Patent Application Publication No. 4-190387 (disclosed on Jul. 8, 1992)

SUMMARY OF INVENTION

Technical Problem

Along with increased definition of video display as described above, the number of input terminals for data signal lines has markedly increased for array substrates for display devices. Accordingly, a conventional configuration wherein input terminals for data signal lines are simply arrayed along the long side of an array substrate, that is, along a side in a direction orthogonal to a direction in which a data signal line extends, has a problem in that, along with further increase in definition of video display, a necessary number of input terminals cannot be arrayed.

Accordingly, it is an object of the present invention to provide an array substrate, a display device, a liquid crystal panel, and a liquid crystal display device, which can handle further higher definition.

Solution to Problem

In order to solve the above problem, an array substrate of the present invention is an array substrate having a first side and a second side which are adjacent to each other, including: a plurality of data signal lines formed so as to extend in a direction parallel to the second side, and also so as to array in a direction perpendicular to the second side; a plurality of second input terminals formed along the second side to which edge portions of a plurality of data signal lines formed in a position on a closer side to the second side of the data signal lines are each connected; and a plurality of first input terminals formed along the first side to which edge portions of a plurality of data signal lines formed in a position on a farther side from the second side are each connected.

In other words, an array substrate of the present invention is an array substrate having a first side and a second side which are adjacent to each other, including a plurality of data signal lines, a first input terminal electrically connected to one of these data signal lines, and a second input terminal electrically connected to another one of these data signal lines, wherein, with the first input terminal, distance from the first side is shorter than distance from the second side in a plane view, and with the second input terminal, distance from the second side is shorter than distance from the first side in a plane view.

Advantageous Effects of Invention

According to the configuration of the present invention, a plurality of first input terminals to which a plurality of data signal lines are connected are formed on the first side, and further, a plurality of second input terminals to which a plurality of data signal lines are connected are formed on the second side. In this manner, input terminals as to data signal lines are formed on the first and second sides which are adjacent to each other, and accordingly, a necessary number of input terminals can be formed in a sure manner, and higher definition can be handled.

DESCRIPTION OF EMBODIMENTS (First Embodiment)
An embodiment of the present invention will be described below based on the drawings. With the present embodiment, a liquid crystal display device serving as an example of a display device will be illustrated.

Figure 1:
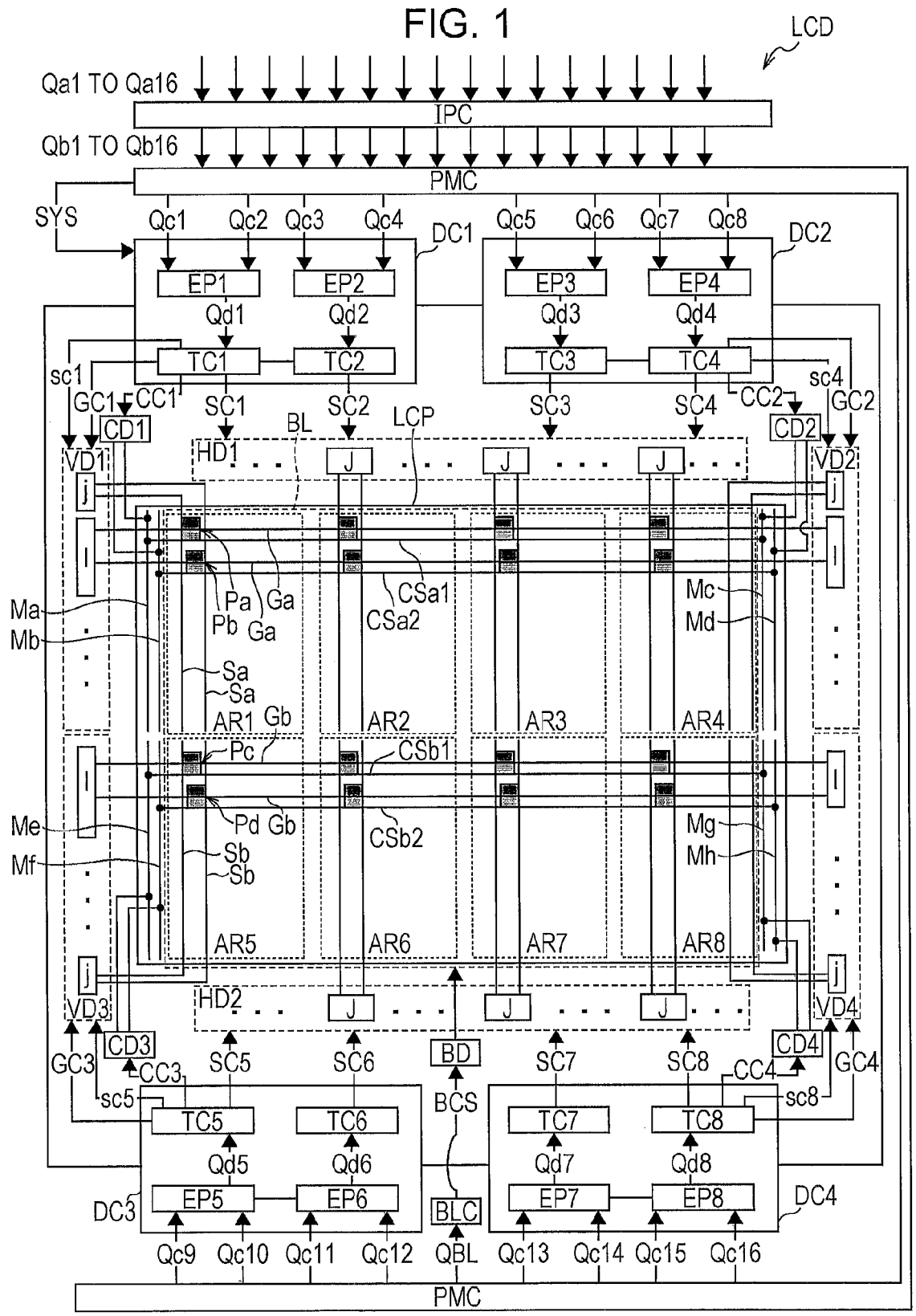
FIG. 1 is an explanatory diagram illustrating a configuration of a liquid crystal display device serving as a display device of an embodiment of the present invention.

FIG. 1 is an explanatory diagram illustrating a configuration of a liquid crystal display device LCD serving as a display device of an embodiment of the present invention. The liquid crystal display device LCD illustrated in FIG. 1 conforms to video standards having resolution 16 times full HD resolution (8K4K, Super Hi-Vision SHV having resolution of 7680×4320 is also this kind).

This liquid crystal display device LCD includes a liquid crystal panel LCP, a backlight BL, a power unit for backlights (not illustrated), a power unit for driving liquid crystal (not illustrated), two horizontal drivers HD1 and HD2, four vertical drivers VD1 to VD4, an input processing circuit IPC, a pixel mapping circuit PMC, four display control substrates DC1 to DC4, a backlight driver BLD, a backlight controller BLC, a power supply controller (not illustrated), and four CS drivers CD1 to CD4.

The liquid crystal panel LCP includes an active matrix substrate (array substrate, not illustrated), a liquid crystal layer (not illustrated), and an opposing substrate (not illustrated). Provided to the active matrix substrate are multiple TFTs (thin-film transistors, not illustrated), a plurality of pixel electrodes (not illustrated), data signal lines (Sa and Sb in FIG. 1) extending in the column direction (direction along the short side of the liquid crystal panel), scanning signal lines (Ga and Gb in FIG. 1) extending in the row direction (direction along the long side of the liquid crystal panel), holding capacity wiring (CS wiring) (CSa and CSb in FIG. 1) extending in the row direction, and CS trunk wiring (Ma to Mh in FIG. 1) extending in the column direction. Provided to the opposing substrate are a common electrode (not shown), a color filter, and a black matrix (not illustrated).

The liquid crystal panel LCP has a so-called vertical dividing double source structure, whereby four scanning signal lines can be selected at the same time (quad-speed drive). Therefore, two data signal lines are provided so as to correspond to an upper half of one pixel column (the upstream side of the panel), and also, two data signal lines are provided so as to correspond to a lower half of the same pixel column (the downstream side of the panel).

Figure 2:
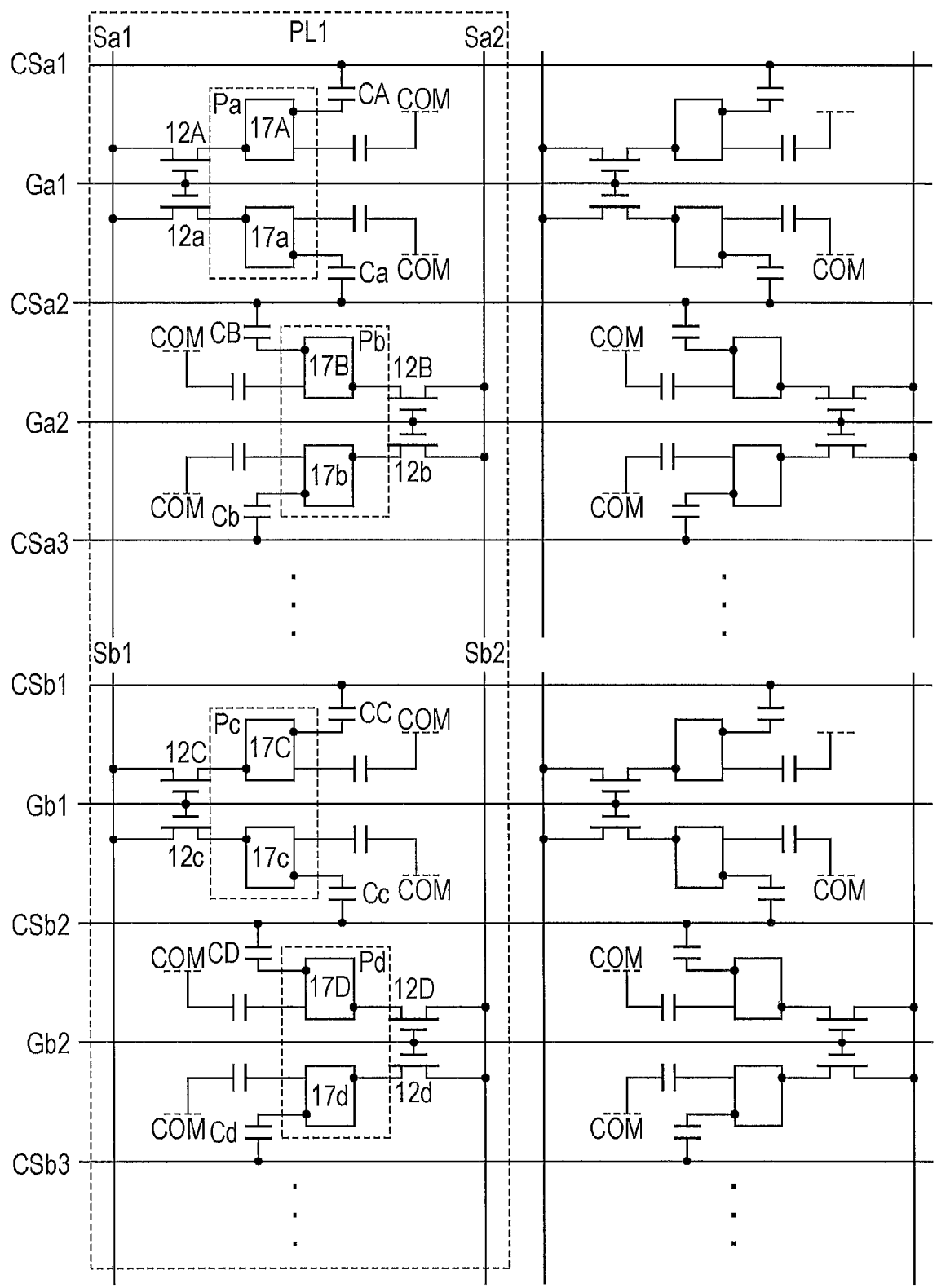
FIG. 2 is a circuit diagram illustrating a configuration of a multi-pixel format in the liquid crystal panel illustrated in FIG. 1.

Further, the liquid crystal panel LCP is a so-called multi-pixel format where two pixel electrodes are provided to one pixel, whereby the view angle property can be improved with a bright region and a dark region formed within one pixel. FIG. 2 is a circuit diagram illustrating a configuration of the multi-pixel format in the liquid crystal panel LCP illustrated in FIG. 1.

As illustrated in FIG. 2, at the liquid crystal panel LCP, for example, with each pixel of an upper half in one pixel column PL1, adjacent pixels Pa and Pb are included in the column direction, and also with each pixel of a lower half in the same pixel column PL1 thereof, adjacent pixels Pc and Pd are included in the column direction.

A TFT 12A connected to one of two pixel electrodes 17A and 17a included in a pixel Pa and a TFT 12a connected to the other are connected to a data signal line Sa1 and a scanning signal line Ga1, respectively. One of the above two pixel electrodes 17A and 17a forms a holding capacity wiring CSa1 and holding capacity CA, and the other forms a holding capacity wiring CSa2 and holding capacity Ca.

A TFT 12B connected to one of two pixel electrodes 17B and 17b included in a pixel Pb and a TFT 12b connected to the other are connected to a data signal line Sat and a scanning signal line Gat, respectively. One of the above two pixel electrodes 17B and 17b forms a holding capacity wiring CSa2 and holding capacity CB, and the other forms a holding capacity wiring CSa3 and holding capacity Cb.

A TFT 12C connected to one of two pixel electrodes 17C and 17c included in a pixel Pc and a TFT 12c connected to the other are connected to a data signal line Sb1 and a scanning signal line Gb1, respectively. One of the above two pixel electrodes 17C and 17c forms a holding capacity wiring CSb1 and holding capacity CC, and the other forms a holding capacity wiring CSb2 and holding capacity cc.

A TFT 12D connected to one of two pixel electrodes 17D and 17d included in a pixel Pd and a TFT 12d connected to the other are connected to a data signal line Sb2 and a scanning signal line Gb2, respectively. One of the above two pixel electrodes 17D and 17d forms a holding capacity wiring CSb2 and holding capacity CD, and the other forms a holding capacity wiring CSb3 and holding capacity Cd.

The scanning signal lines Ga1, Gat, Gb1, and Gb2 are selected at the same time. Note that the number of data signal lines provided to the upper half of the panel is at least 7680 (pixels)×3 (primary colors)×2 (double sources)=46080 lines (the lower half of the panel has also the same number).

As illustrated in FIG. 1, with an upper half of the liquid crystal panel LCP, the horizontal driver HD1 is provided along one long side included in an upper half of the liquid crystal panel LCP, and includes 38 horizontal-side source driver chips (first-side side data signal line driving circuit, driving circuit chip) J arrayed in the row direction. The number of output terminals of one horizontal-side source driver chip J is 960.

The vertical driver VD1 is provided along one of two short sides (left and right short sides) included in an upper half of the liquid crystal panel LCP, and includes five vertical-side source driver chips (second-side side data signal line driving circuit, driving circuit chip) j arrayed in the column direction in positions on the long-side side, and a plurality of gate driver chips l arrayed in the column direction. The number of output terminals of one source driver chip is 960. The vertical driver VD2 is provided along the other of the above two short sides (left and right short sides) included in an upper half of the liquid crystal panel LCP, and includes five vertical-side source driver chips j arrayed in the column direction in positions on the long-side side, and a plurality of gate driver chips l arrayed in the column direction. The number of output terminals of one source driver chip is 960.

The data signal lines Sa are driven by the vertical-side source driver chips j of the vertical driver VD1, the vertical-side source driver chips j of the vertical driver VD2, and the horizontal-side source driver chips J of the horizontal driver HD1. The scanning signal lines Ga are driven by the gate driver chips l of the vertical driver VD1 and the gate driver chips l of the vertical driver VD2.

Similarly, with a lower half of the liquid crystal panel LCP, the horizontal driver HD2 is provided alone one long side included in a lower half of the liquid crystal panel LCP, and includes 38 horizontal-side source driver chips J arrayed in the row direction. The number of output terminals of one source driver chip is 960.

The vertical driver VD3 is provided along one of two short sides (left and right short sides) included in a lower half of the liquid crystal panel LCP, and includes five vertical-side source driver chips j arrayed in the column direction in positions on the long-side side, and a plurality of gate driver chips l arrayed in the column direction. The number of output terminals of one source driver chip is 960. The vertical driver VD4 is provided along the other of the above two short sides (left and right short sides) included in a lower half of the liquid crystal panel LCP, and includes five vertical-side source driver chips j arrayed in the column direction in positions on the long-side side, and a plurality of gate driver chips l arrayed in the column direction. The number of output terminals of one source driver chip is 960.

Note that the number of vertical-side source driver chips j provided to the vertical drivers VD1 to VD4 is not particularly restricted, and is set as appropriate according to layout conditions of the source driver chips in the liquid crystal display device LCD.

The data signal lines Sb are driven by the vertical-side source driver chips j of the vertical driver VD3, the vertical-side source driver chips j of the vertical driver VD4, and the horizontal-side source driver chips J of the horizontal driver HD2. The scanning signal lines Gc and Gd are driven by the gate driver chips l of the vertical driver VD3 and the gate driver chips l of the vertical driver VD4.

The CS trunk wiring Ma and Mb are provided in the vicinity of one of two short sides (left and right short sides) included in an upper half of the active matrix substrate, and are driven by the CS driver CD1 so that each has a different phase. The CS trunk wiring Mc and Md are provided in the vicinity of the other of the above two short sides (left and right short sides) included in an upper half of the active matrix substrate, and are driven by the CS driver CD2 so that each has a different phase.

The CS trunk wiring Me and Mf are provided in the vicinity of one of two short sides (left and right short sides) included in a lower half of the active matrix substrate, and are driven by the CS driver CD3 so that each has a different phase. The CS trunk wiring Mg and Mh are provided in the vicinity of the other of the above two short sides (left and right short sides) included in a lower half of the active matrix substrate, and are driven by the CS driver CD4 so that each has a different phase.

The holding capacity wiring CSa1 is connected to the CS trunk wiring Ma and Mc, and the holding capacity wiring CSa2 is connected to the CS trunk wiring Mb and Md. The holding capacity wiring CSb1 is connected to the CS trunk wiring Me and Mg, and the holding capacity wiring CSb2 is connected to the CS trunk wiring Mf and Mh.

Now, for example, with the pixel Pb, as illustrated in FIG. 2, one of the two pixel electrodes 17B and 17b forms capacitance along with the holding capacity wiring CSa2, and the other forms capacitance along with the holding capacity wiring CSa3. Accordingly, for example, when performing control so that the electrodes of the CS trunk wiring Ma and Mb have an opposite phase, the electrodes of the holding capacity wiring CSa2 and CSa3 also have an opposite phase. Thus, after writing the same signal potential to the above two pixel electrodes 17B and 17b, one effective potential and the other effective potential can be vertically distributed, that is, a bright region and a dark region can be formed within one pixel.

The display control substrate DC1 includes two video processing circuits EP1 and EP2, and two timing controllers TC1 and TC2. The display control substrate DC2 includes two video processing circuits EP3 and EP4, and two timing controllers TC3 and TC4. The display control substrate DC3 includes two video processing circuits EP5 and EP6, and two timing controllers TC5 and TC6. The display control substrate DC4 includes two video processing circuits EP7 and EP8, and two timing controllers TC7 and TC8.

The display control substrates DC1 to DC4 have charge of processing of each region when dividing the liquid crystal panel LCP into four divisions of vertically two divisions and also horizontally two divisions. Specifically, the display control substrate DC1 has charge of control of the first region (upper left region) and processing of video corresponding to the first region (resolution 4K2K). The display control substrate DC2 has charge of control of the second region (upper right region) and processing of video corresponding to the second region (resolution 4K2K). The display control substrate DC3 has charge of control of the third region (lower left region) and processing of video corresponding to the third region (resolution 4K2K). The display control substrate DC4 has charge of control of the fourth region (lower right region) and processing of video corresponding to the fourth region (resolution 4K2K).

Specifically, with the display control substrate DC1, the video processing circuit EP1 performs processing of video corresponding to a left half AR1 of the first region (resolution 2K2K). The timing controller TC1 receives processing results of the video processing circuit EP1 and synchronizing signals SYS received from the pixel mapping circuit PMC, outputs a source control signal SC1 to the horizontal-side source driver chip J corresponding to the AR1, and outputs a source control signal sc1 to the vertical-side source driver chip j of the vertical driver VD1. Further, the timing controller TC1 outputs a gate control signal GC1 to the gate driver chips l of the vertical driver VD1, and outputs a CS control signal CC1 to the CS driver CD1.

The video processing circuit EP2 performs processing of video corresponding to a right half AR2 of the first region (resolution 2K2K). The timing controller TC2 receives processing results of the video processing circuit EP2 and the synchronizing signals SYS received from the timing controller TC1, and outputs a source control signal SC2 to the horizontal-side source driver chip J corresponding to the AR2.

The video processing circuit EP3 performs processing of video corresponding to a left half AR3 of the second region (resolution 2K2K). The timing controller TC3 receives processing results of the video processing circuit EP3 and the synchronizing signals SYS received from the timing controller TC1, and outputs a source control signal SC3 to the horizontal-side source driver chip J corresponding to the AR3.

The video processing circuit EP4 performs processing of video corresponding to a right half AR4 of the second region (resolution 2K2K). The timing controller TC4 receives processing results of the video processing circuit EP4 and the synchronizing signals SYS received from the timing controller TC1, outputs a source control signal SC4 to the horizontal-side source driver chip J corresponding to the AR4, and outputs a source control signal sc4 to the vertical-side source driver chip j of the vertical driver VD2. Further, the timing controller TC4 outputs a gate control signal GC2 to the gate driver chips l of the vertical driver VD2, and outputs a CS control signal CC2 to the CS driver CD2.

The video processing circuit EP5 performs processing of video corresponding to a left half AR5 of the third region (resolution 2K2K). The timing controller TC5 receives processing results of the video processing circuit EP5 and the synchronizing signals SYS received from the timing controller TC1, outputs a source control signal SC5 to the horizontal-side source driver chip J corresponding to the AR5, and outputs a source control signal sc5 to the vertical-side source driver chip j of the vertical driver VD3. Further, the timing controller TC5 outputs a gate control signal GC3 to the gate driver chips l of the vertical driver VD3, and outputs a CS control signal CC3 to the CS driver CD3.

The video processing circuit EP6 performs processing of video corresponding to a right half AR6 of the third region (resolution 2K2K). The timing controller TC6 receives processing results of the video processing circuit EP6 and the synchronizing signals SYS received from the timing controller TC1, and outputs a source control signal SC6 to the horizontal-side source driver chip J corresponding to the AR6.

The video processing circuit EP7 performs processing of video corresponding to a left half AR7 of the fourth region (resolution 2K2K). The timing controller TC7 receives processing results of the video processing circuit EP7 and the synchronizing signals SYS received from the timing controller TC1, and outputs a source control signal SC3 to the horizontal-side source driver chip J corresponding to the AR7.

The video processing circuit EP8 performs processing of video corresponding to a right half AR8 of the fourth region (resolution 2K2K). The timing controller TC8 receives processing results of the video processing circuit EP8 and the synchronizing signals SYS received from the timing controller TC1, outputs a source control signal SC8 to the horizontal-side source driver chip J corresponding to the AR8, and outputs a source control signal sc8 to the vertical-side source driver chip j of the vertical driver VD4. Further, the timing controller TC8 outputs a gate control signal GC4 to the gate driver chips l of the vertical driver VD4, and outputs a CS control signal CC4 to the CS driver CD4.

Note that, included in the source control signals SC1 to SC8, sc1, sc4, sc5, and sc8 are data signals, a data enable signal, a source start pulse, and a source clock, and included in the gate control signals GC1 to GC4 are an initial signal, a gate start pulse, and a gate clock.

Video signals to be input to the input processing circuit IPC may be video signals having 8K4K resolution in a block scan format (e.g., Super Hi-Vision), or may be video signals having 8K4K resolution in a multi-display format. It goes without saying that the video signals may be video signals having 4K2K resolution, or may be video signals having 2K1K resolution (full HD resolution).

The block scan format is a format to be transmitted by dividing one frame (whole image having 8K4K resolution) into 16 rough-textured (full HD resolution) whole images (so-called thinned-out images). In this case, each of 16 video signals Qa1 to Qa to be input to the input processing circuit IPC makes up a rough-textured whole image (full HD resolution).

The multi-display format is a format to be transmitted by dividing one frame (whole image having 8K4K resolution) without changing fineness in texture into 16 divisions, 16 partial images. In this case, each of the 16 video signals Qa1 to Qa to be input to the input processing circuit IPC makes up a fine-textured partial image (full HD resolution).

The input processing circuit IPC performs pixel data synchronizing processing, gamma correction processing, color temperature correction processing, color-gamut-conversion processing, or the like, and outputs video signals Qb1 to Qb16 to the pixel mapping circuit PMC.

The pixel mapping circuit PMC divides a video signal corresponding to the AR1 (resolution 2K2K) into two (full HD resolution video signals Qc1 and Qc2), and outputs to the video processing circuit EP1 of the display control substrate DC1. Also, the pixel mapping circuit PMC divides a video signal corresponding to the AR2 (resolution 2K2K) into two (full HD resolution video signals Qc3 and Qc4), and outputs to the video processing circuit EP2 of the display control substrate DC1. Also, the pixel mapping circuit PMC divides a video signal corresponding to the AR3 (resolution 2K2K) into two (full HD resolution video signals Qc5 and Qc6), and outputs to the video processing circuit EP3 of the display control substrate DC2. Also, the pixel mapping circuit PMC divides a video signal corresponding to the AR4 (resolution 2K2K) into two (full HD resolution video signals Qc7 and Qc8), and outputs to the video processing circuit EP4 of the display control substrate DC2. Also, the pixel mapping circuit PMC divides a video signal corresponding to the AR5 (resolution 2K2K) into two (full HD resolution video signals Qc9 and Qc10), and outputs to the video processing circuit EP5 of the display control substrate DC3. Also, the pixel mapping circuit PMC divides a video signal corresponding to the AR6 (resolution 2K2K) into two (full HD resolution video signals Qc11 and Qc12), and outputs to the video processing circuit EP6 of the display control substrate DC3. Also, the pixel mapping circuit PMC divides a video signal corresponding to the AR7 (resolution 2K2K) into two (full HD resolution video signals Qc13 and Qc14), and outputs to the video processing circuit EP7 of the display control substrate DC4. Also, the pixel mapping circuit PMC divides a video signal corresponding to the AR8 (resolution 2K2K) into two (full HD resolution video signals Qc15 and Qc16), and outputs to the video processing circuit EP8 of the display control substrate DC4. Further, the pixel mapping circuit PMC transmits the synchronizing signals SYS to the timing controller TC1 of the display control substrate DC1.

The video processing circuit EP1 subjects the video signals Qc1 and Qc2 to video processing such as high-speed display (QS) processing and frame rate conversion (FRC) processing or the like, and outputs a video signal Qd1 to the timing controller TC1. The video processing circuit EP2 subjects the video signals Qc3 and Qc4 to the above video processing, and outputs a video signal Qd2 to the timing controller TC2. The video processing circuit EP3 subjects the video signals Qc5 and Qc6 to the above video processing, and outputs a video signal Qd3 to the timing controller TC3. The video processing circuit EP4 subjects the video signals Qc7 and Qc8 to the above video processing, and outputs a video signal Qd4 to the timing controller TC4. The video processing circuit EP5 subjects the video signals Qc9 and Qc10 to the above video processing, and outputs a video signal Qd5 to the timing controller TC5. The video processing circuit EP6 subjects the video signals Qc11 and Qc12 to the above video processing, and outputs a video signal Qd6 to the timing controller TC6. The video processing circuit EP7 subjects the video signals Qc13 and Qc14 to the above video processing, and outputs a video signal Qd7 to the timing controller TC7. The video processing circuit EP8 subjects the video signals Qc15 and Qc16 to the above video processing, and outputs a video signal Qd8 to the timing controller TC8.

The display control substrates DC1 to DC4 synchronize mutual operation by exchanging signals between substrates. Specifically, the display control substrate DC1 which is a master transmits a RDY (preparation completion) signal to the display control substrate DC2. The display control substrate DC2 which has received this transmits a RDY signal to the display control substrate DC3 as soon as preparation has been completed. The display control substrate DC3 which has received this transmits a RDY signal to the display control substrate DC4 as soon as preparation has been completed. The display control substrate DC4 which has received this returns a RDY signal to the display control substrate DC1 as soon as preparation has been completed. The display control substrate DC1 transmits, in response to a RDY signal being returned, an operation start (SRST) signal to the display control substrate DC2 to the display control substrate DC4 which are slaves all at once.

Note that, after start of operation, the display control substrate DC1 which is the master transmits the synchronizing signals SYS (vertical synchronizing signal, horizontal synchronizing signal, clock signal, data enable signal, polarity inversion signal, and so forth) received from the pixel mapping circuit PMC to the display control substrates DC2 to DC4 which are slaves, all at once.

The backlight controller BLC receives a video signal QBL output from the pixel mapping circuit PMC, and outputs a backlight control signal to the backlight driver BD. According to this backlight driver BD, the backlight BL is driven. Note that the backlight BL is divided into multiple, and each thereof is individually subjected to brightness adjustment according to the video signal QBL. The power supply controller monitors summation (total electric energy) of electric energy to be supplied from a commercial power source to the power unit for backlights, and electric energy to be supplied from another commercial power source to the power unit for driving liquid crystal, and in the event that the total electric energy has been lowered for some reason, preferentially distributes power to the power unit for driving liquid crystal (reduces power to be distributed to the power unit for backlights).

Figure 3:
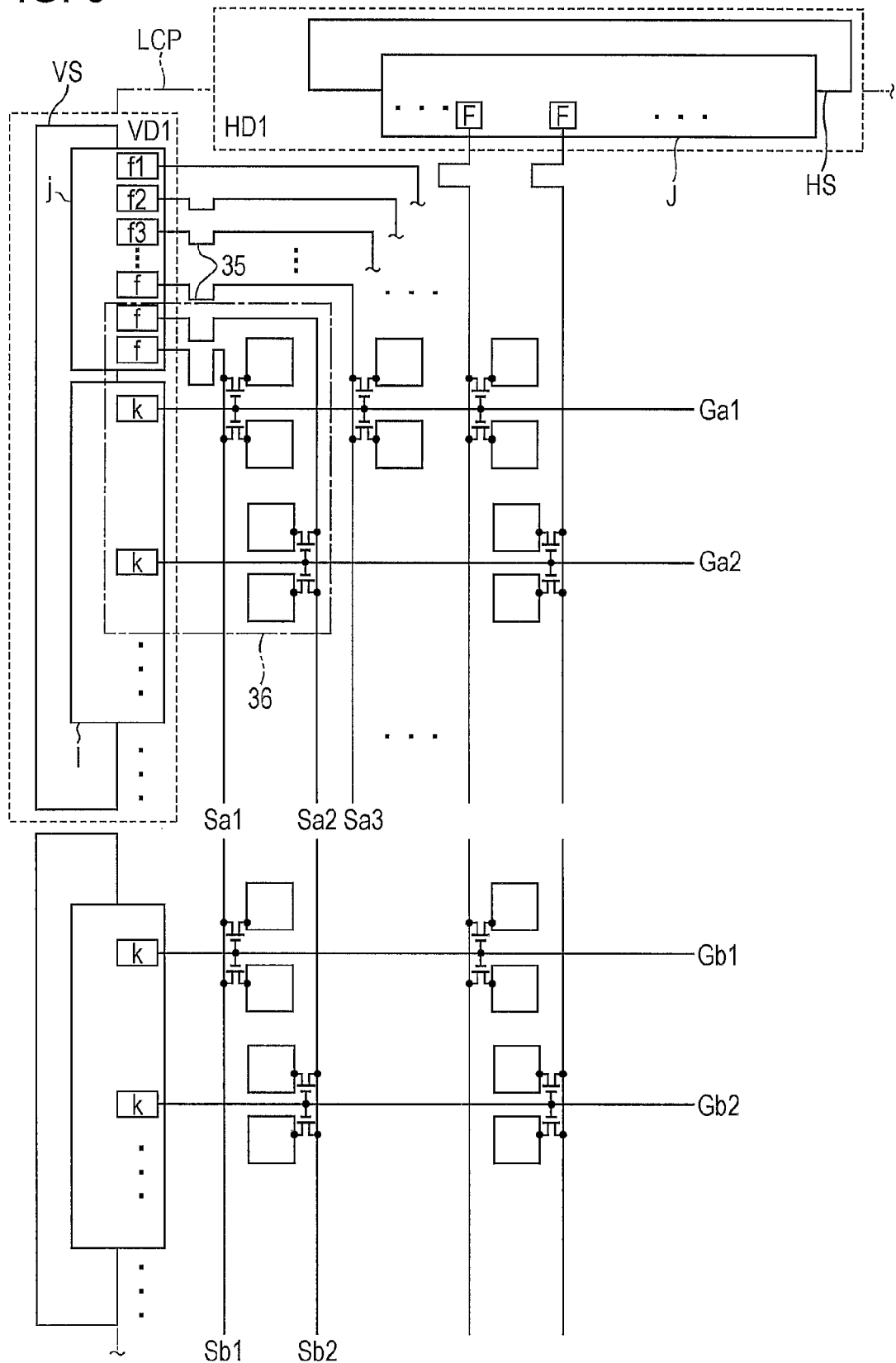
FIG. 3 is an explanatory diagram illustrating a configuration of principal portions in the liquid crystal display device illustrated in FIG. 1.

FIG. 3 is an explanatory diagram illustrating a configuration of principal portions in the liquid crystal display device LCD illustrated in FIG. 1. FIG. 3 illustrates a configuration in the vicinity of the horizontal driver HD1 and vertical driver VD1 in the liquid crystal display device LCD.

Figure 4:
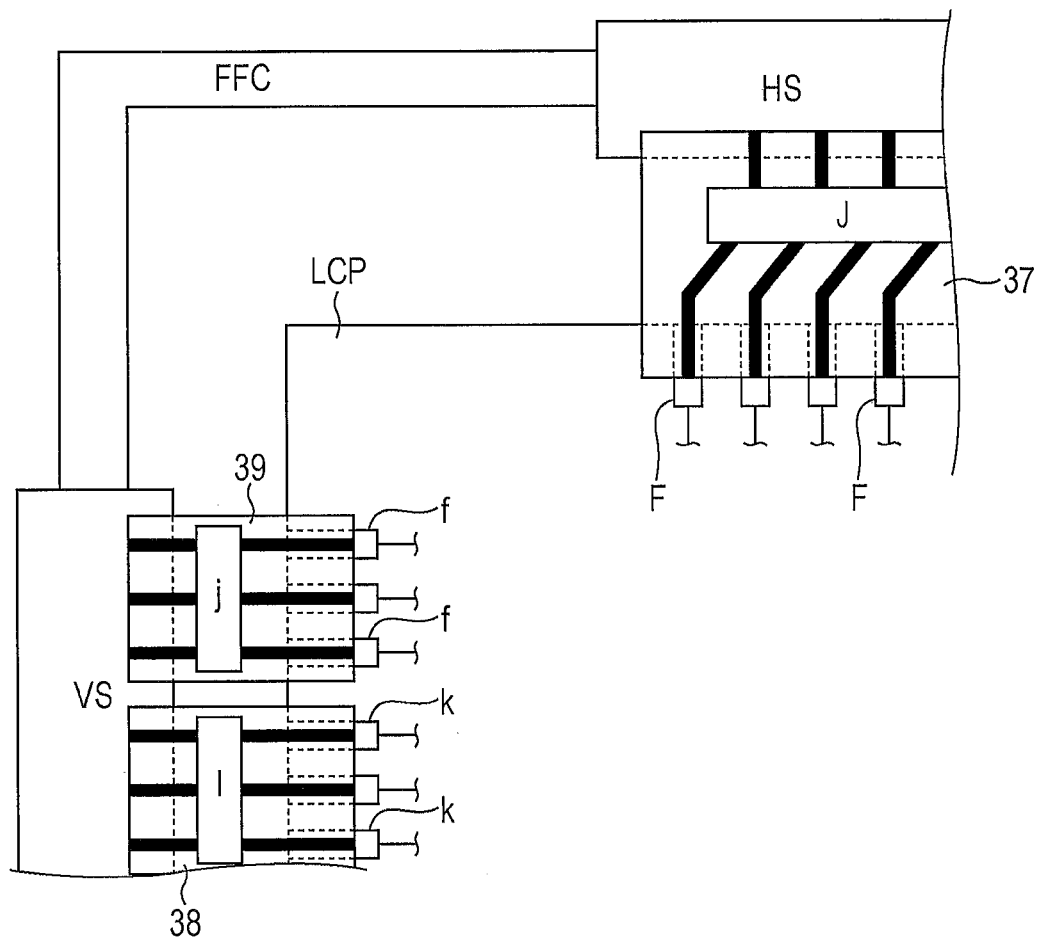
FIG. 4 is an explanatory diagram illustrating a layout configuration of a horizontal-side source driver chip, a vertical-side source driver chip, and a gate driver chip in the liquid crystal display device illustrated in FIG. 1.

As illustrated in FIG. 3, the horizontal driver HD1 has a configuration wherein the horizontal-side source driver chips J are provided to the horizontal driver substrate HS. The horizontal-side source driver chips J are connected to the horizontal-side source terminals (first input terminal) F of the liquid crystal panel LCP. Specifically, as illustrated in FIG. 4, the horizontal-side source driver chips J are provided to the horizontal driver substrate HS in a state mounted on a horizontal-side SOF (System On Film) 37, and are connected to the horizontal-side source terminals F of the liquid crystal panel LCP via the horizontal-side SOF 37. The above configuration is the same regarding another horizontal driver HD2. Note that FIG. 4 is an explanatory diagram illustrating a layout configuration of the horizontal-side source driver chip J, vertical-side source driver chip j, and gate driver chip 1 in the liquid crystal display device LCD.

The vertical driver VD1 has a configuration wherein the vertical-side source driver chip j and gate driver chips l are provided to the vertical driver substrate (substrate) VS so as to be arrayed along the short side of the liquid crystal panel LCP. The vertical-side source driver chip j is disposed in a position on the more long-side side of the liquid crystal panel LCP than the gate driver chips l.

Specifically, as illustrated in FIG. 4, the vertical-side source driver chip j is provided to the vertical driver substrate VS in a state mounted on the vertical-side source SOF (second-side side first driving circuit substrate) 39, and is connected to the vertical-side source terminals (second input terminal) f of the liquid crystal panel LCP via the vertical-side source SOF 39. Also, the gate driver chips l are provided to the vertical driver substrate VS in a state mounted on the vertical-side gate SOF (second-side side second driving circuit substrate) 38, and are connected to the gate terminals (third input terminal) k of the liquid crystal panel LCP via the vertical-side gate SOF 38. Note that the vertical driver substrate VS for the vertical-side source driver chip j and the vertical driver substrate VS for the gate driver chips l may independently be provided. The above configuration is the same regarding other vertical drivers VD2 to VD4.

With two short sides (left and right short sides) of the liquid crystal panel LCP, a great number of vertical-side source terminals f are formed in a position on one of the long-side sides and in a position on the other long-side side along each of the short sides. Also, a great number of gate terminals k are formed in a position between a vertical-side source terminal f group of both sides (up and down) in one short side of two short sides (left and right short sides) of the liquid crystal panel LCP, and in a position between the vertical-side source terminal f group of both sides (upper and lower) in the other short side along each of the short sides.

Also, a great number of horizontal-side source terminals F are formed on two long sides (upper and lower long sides) of the liquid crystal panel LCP along each of the long sides.

With an upper half of the liquid crystal panel LCP, the data signal lines Sa are, except for both end sides in the alignment direction of the data signal lines Sa, that is, the data signal lines Sa on two short-side sides, connected to a horizontal-side source terminal F on the upper side at the edge portion of the long-side side of the liquid crystal panel LCP.

On the other hand, of the above data signal lines Sa on the two short-side sides, the data signal lines Sa on one of the short-side sides are connected to a vertical-side source terminal f on one of the short-side sides at the edge portion of the long-side side (upper side) of the liquid crystal panel LCP. Accordingly, the data signal lines Sa thereof extend toward one of the short sides in parallel to the scanning signal lines Ga at the edge portion of the long-side side (upper side) of the liquid crystal panel LCP, and reach a vertical-side source terminal f. Also, of the above data signal lines Sa on the two short-side sides, the data signal lines Sa on the other short-side side are connected to a vertical-side source terminal f on the other short-side side at the edge portion of the long-side side (upper side) of the liquid crystal panel LCP. Accordingly, the data signal lines Sa thereof extend toward the other short side in parallel to the scanning signal lines Ga at the edge portion of the long-side side (upper side) of the liquid crystal panel LCP, and reach a vertical-side source terminal f.

Similarly, with a lower half of the liquid crystal panel LCP, the data signal lines Sb are, except for both end sides in the alignment direction of the data signal lines Sb, that is, the data signal lines Sb on two short-side sides, connected to a horizontal-side source terminal F on the lower side at the edge portion of the long-side side of the liquid crystal panel LCP.

On the other hand, of the above data signal lines Sb on the two short-side sides, the data signal lines Sb on one of the short-side sides are connected to a vertical-side source terminal f on one of the short-side sides at the edge portion of the long-side side (lower side) of the liquid crystal panel LCP. Accordingly, the data signal lines Sa thereof extend toward one of the short sides in parallel to the scanning signal lines Ga at the edge portion of the long-side side (lower side) of the liquid crystal panel LCP, and reach a vertical-side source terminal f. Also, of the above data signal lines Sa on the two short-side sides, the data signal lines Sa on the other short-side side are connected to a vertical-side source terminal f on the other short-side side at the edge portion of the long-side side (lower side) of the liquid crystal panel LCP. Accordingly, the data signal lines Sa thereof extend toward the other short side in parallel to the scanning signal lines Ga at the edge portion of the long-side side (lower side) of the liquid crystal panel LCP, and reach a vertical-side source terminal f.

Also, with an upper half and a lower half of the liquid crystal panel LCP, the scanning signal lines Ga and Gb are connected to a gate terminal k on one of the short-side sides in the liquid crystal panel LCP at one end portion, and are connected to a gate terminal k on the other short side in the liquid crystal panel LCP at the other end.

Here, as illustrated in FIG. 3, with the liquid crystal panel LCP, a great number of data signal lines Sa and Sb are connected to a horizontal-side source terminal F, that is, a horizontal-side source driver chip J. On the other hand, some of the data signal lines Sa and Sb are connected to a vertical-side source terminal f, that is, a vertical-side source driver chip j. In this case, with regard to the lengths of the data signal lines Sa and Sb, when not changing the lengths thereof, the data signal lines Sa and Sb connected to a horizontal-side source driver chip J, and data signal lines S connected to a vertical-side source driver chip j differ. Further, even the data signal lines Sa and Sb connected to a vertical-side source driver chip j differ. Thus, in the event that the line lengths of the data signal lines Sa and Sb differ, time constants (CR) differ, and accordingly, desired gradation may not be obtained in the liquid crystal panel LCP.

Therefore, with the liquid crystal display device LCD of the present embodiment, an adjusting unit configured to lengthen a line length is formed in other data signal lines Sa and Sb in accordance with the line lengths of the data signal lines Sa and Sb having the longest line length so that the line lengths of the data signal lines Sa and Sb in the liquid crystal panel LCP agree.

Specifically, with the liquid crystal panel LCP exemplified in FIG. 3, the data signal liens Sa and Sb connected to a vertical-side source terminal f1 closest to the long side of the liquid crystal panel LCP have the longest line length (hereinafter, referred to as the longest data signal line Smax). Therefore, with regard to data signal lines S other than the above longest data signal line Smax, a bypassing unit is provided as a length adjusting unit 35 in the neighborhood position (a location closer to the terminal where no pixel is formed) of a terminal (vertical-side source terminal f or horizontal-side source terminal F) to which the data signal lines Sa and Sb are connected.

With the above configuration, at the liquid crystal display device LCD, not only the horizontal-side source driver chips J are provided to the horizontal drivers HD1 and HD2 but also the vertical-side source driver chips j are provided to the vertical drivers VD1 to VD4. Accordingly, just for the worth of providing the vertical-side source driver chips j, larger layout space for the horizontal-side source driver chips J can be secured in the long-side sides of the liquid crystal panel LCP. Thus, with the liquid crystal panel LCP having the same size, even when increasing the number of the data signal lines Sa and Sb, the number of the horizontal-side source driver chips J can be increased corresponding thereto. As a result thereof, further higher definition can be handled.

Figure 5:
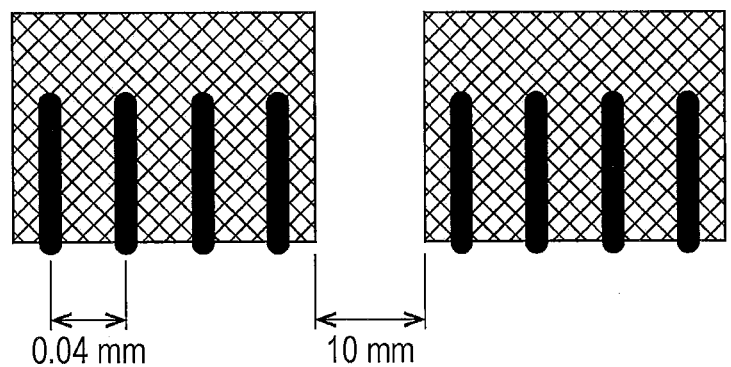
FIG. 5 is an explanatory diagram illustrating a mounting pitch on data signal side in the liquid crystal panel illustrated in FIG. 1.

For example, the liquid crystal display device LCD of the present embodiment performs double source driving with three colors of RGB at the liquid crystal panel LCP of 7,680×4,320 in the Super Hi-Vision format. In this case, the number of data signal lines S is 46,080 lines (7,680×3 (RGB)×2 (double source driving)). Also, as illustrated in FIG. 5, with regard to a mounting pitch on the data signal side of the liquid crystal panel LCP, a pitch between terminals (pitch between horizontal-side source terminals F) is 0.04 mm, and an interval of adjacent source driver chips (horizontal-side source driver chips J) is 10 mm. The current multi-output source driver chip is 960 outputs, and accordingly, the number of source driver chips (SOF number) is 48 chips. Under these conditions, the size of the liquid crystal panel is a 104 type or more since 960(the number of outputs of the source driver chip)×48 (the number of source driver chips)×0.04(terminal pitch)+ (48−1)×10 (SOF interval)=2,313.2 mm(≈104 type).

Accordingly, in order to realize the same number of pixels as with the above case, for example, using a 85-inch (1884-mm) panel size, the pitch between terminals have to be set to 0.031 mm. This pitch between terminals is not realistic in the current technology from the perspectives of implementation and yield.

Therefore, with the liquid crystal panel LCP of the present embodiment, some of the source driver chips are disposed in the vertical drivers VD1 to VD4 as vertical-side source driver chips j.

In this case, for example, in the event that five source driver chips with 960 outputs are disposed in each of the vertical drivers VD1 to VD4, the number of the horizontal-side source driver chips J becomes 38 chips. Accordingly, the pitch between terminals is (1884−(38−1)×10/(960×38)=0.041 mm.

This pitch between terminals is realistic in the current technology. Thus, even with an 85-inch panel size, a super-high definition panel can be realized.

[Second Embodiment]

Another embodiment of the present invention will be described below based on the drawings.

Figure 6:
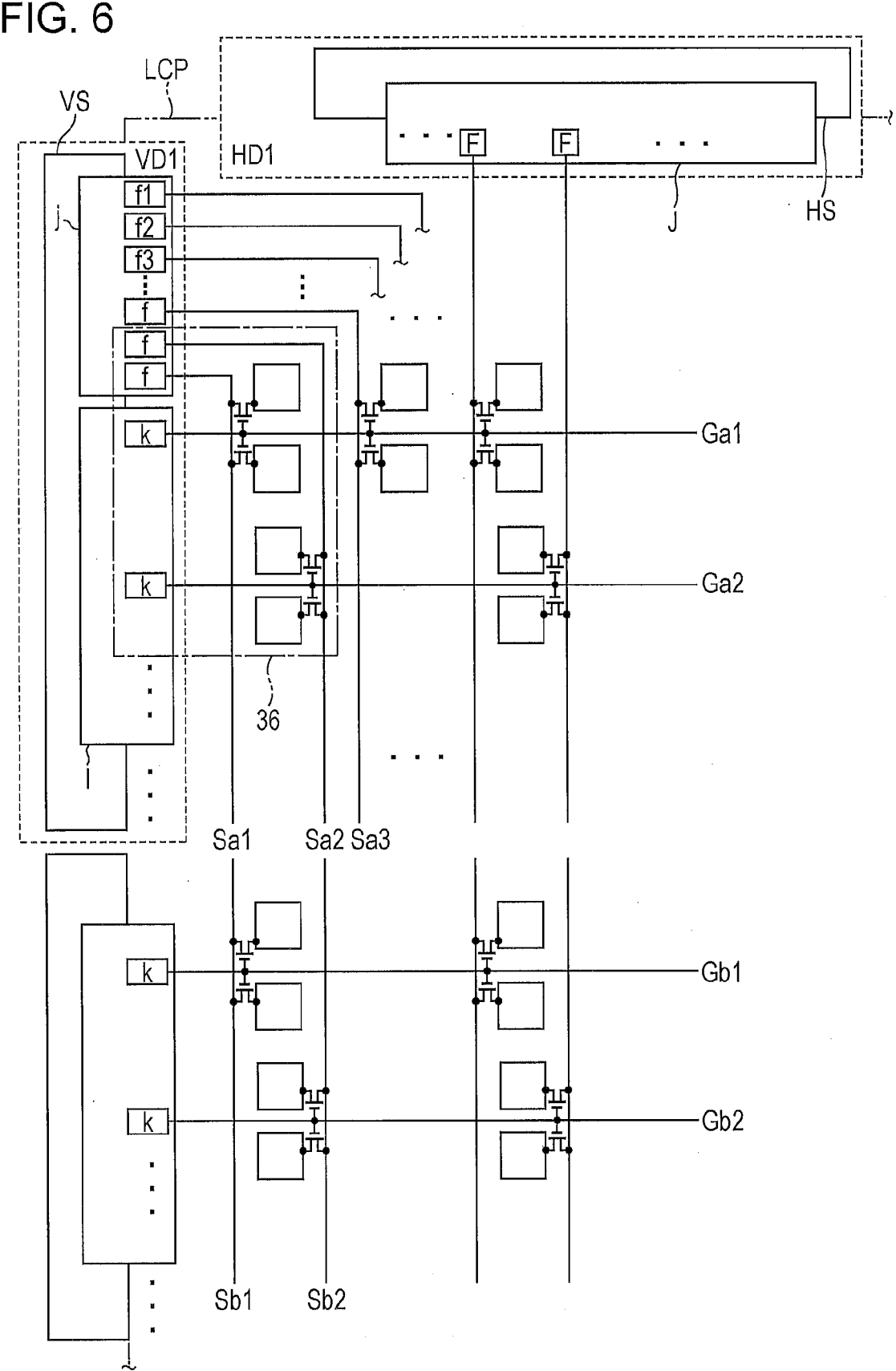
FIG. 6 is an explanatory diagram illustrating a configuration of principal portions in a liquid crystal display device serving as a display device of another embodiment of the present invention.

FIG. 6 is an explanatory diagram illustrating a configuration of principal portions in the liquid crystal display device LCD serving as a display device of another embodiment of the present invention. This liquid crystal display device LCD conforms, in the same way as with the liquid crystal display device LCD illustrated in FIG. 1, to video standards having resolution 16 times full HD resolution (8K4K, Super Hi-Vision SHV having resolution of 7680×4320 is also this kind).

A point that the liquid crystal display device LCD illustrated in FIG. 6 differs from the liquid crystal display device LCD illustrated in FIG. 1 is in that the liquid crystal panel LCP illustrated in FIG. 6 does not include the length adjusting units 35 for the data signal lines Sa and Sb which the liquid crystal panel LCP illustrated in FIG. 1 includes. Accordingly, with the liquid crystal panel LCP illustrated in FIG. 6 as well, the length of the data signal lines Sa and Sb differs between the data signal lines Sa and Sb connected to a horizontal-side source driver chip J and the data signal lines S connected to a vertical-side source driver chip j. Further, even the data signal lines Sa and Sb connected to a vertical-side source driver chip j differ.

With the liquid crystal display device LCD of the present embodiment, instead of forming the length adjusting unit 35 in the data signal lines Sa and Sb, supply voltage to the data signal lines Sa and Sb is adjusted, thereby preventing deterioration in gradation due to difference in the length of the data signal lines Sa and Sb.

With the liquid crystal panel LCP illustrated in FIG. 6, the lengths of the data signal lines Sa and Sb are the same between data signal lines (SS) connected to a horizontal-side source terminal F. On the other hand, with regard to the data signal lines Sa and Sb connected to a vertical-side source terminal f, a data signal line (S1) connected to a vertical-side source terminal f1 is the longest, a data signal line (S2) connected to a vertical-side source terminal f2, a data signal line (S3) connected to a vertical-side source terminal f3, in this manner, as the connected vertical-side source terminal f is separated from the long side on a closer side of the liquid crystal panel LCP, the length becomes shorter.

Here, with regard to the lengths of the data signal lines Sa and Sb, in the event that a data signal line (SD) connected to a vertical-side source terminal f farthest from the long side on a closer side of the liquid crystal panel LCP is longer than data signal lines (SS) connected to a horizontal-side source terminal F, the lengths of the data signal lines Sa and Sb satisfies SS<SD<S3<S2<S1.

Accordingly, for example, in the event of performing the same gradation display, when supplying the same voltage as voltage to be supplied to the data signal lines SS from a horizontal-side source driver chip J to the data signal lines S1, S2, S3, . . . , SD from a vertical-side source driver chip j, deterioration of voltage occurs at the data signal lines S1, S2, S3, . . . , SD. Therefore, with pixels in which a video signal is written from the data signal lines S1, S2, S3, . . . , SD, desired gradation display cannot be performed.

Therefore, with the liquid crystal display device LCD of the present embodiment, in order to perform desired gradation display in pixels in which a video signal is written from the data signal lines S1, S2, S3, . . . , SD, for example, with voltage to be supplied to the data signal line SS from a horizontal-side source driver chip J as a reference, voltage to be supplied from a vertical-side source driver chip j to the data signal lines S1, S2, S3, . . . , SD is adjusted. That is to say, at least voltage to be supplied from a vertical-side source driver chip j to the data signal lines S1, S2, S3, . . . , SD is adjusted so that, with the same gradation display, voltage to be written in pixels by the data signal lines S1, S2, S3, . . . , SD and voltage to be written in a pixel by the data signal lines SS agree.

For example, in the event of performing display of 128 gradation, voltages of the data signal lines S1, S2, S3, . . . , SD are set to voltage for displaying higher gradation than 128 gradation as follows.

SD: 129, S3: 130, S2: 131, S1: 132, SS: 128

However, voltage to be supplied to the data signal lines S1, S2, S3, . . . , SD has to be adjusted by actually driving the liquid crystal panel LCP.

With the liquid crystal display device LCD of the present embodiment, desired gradation display can be performed by adjusting supply voltage to a data signal line having different line length.

[Third Embodiment]

Yet another embodiment of the present invention will be described below based on the drawings.

Figure 7:
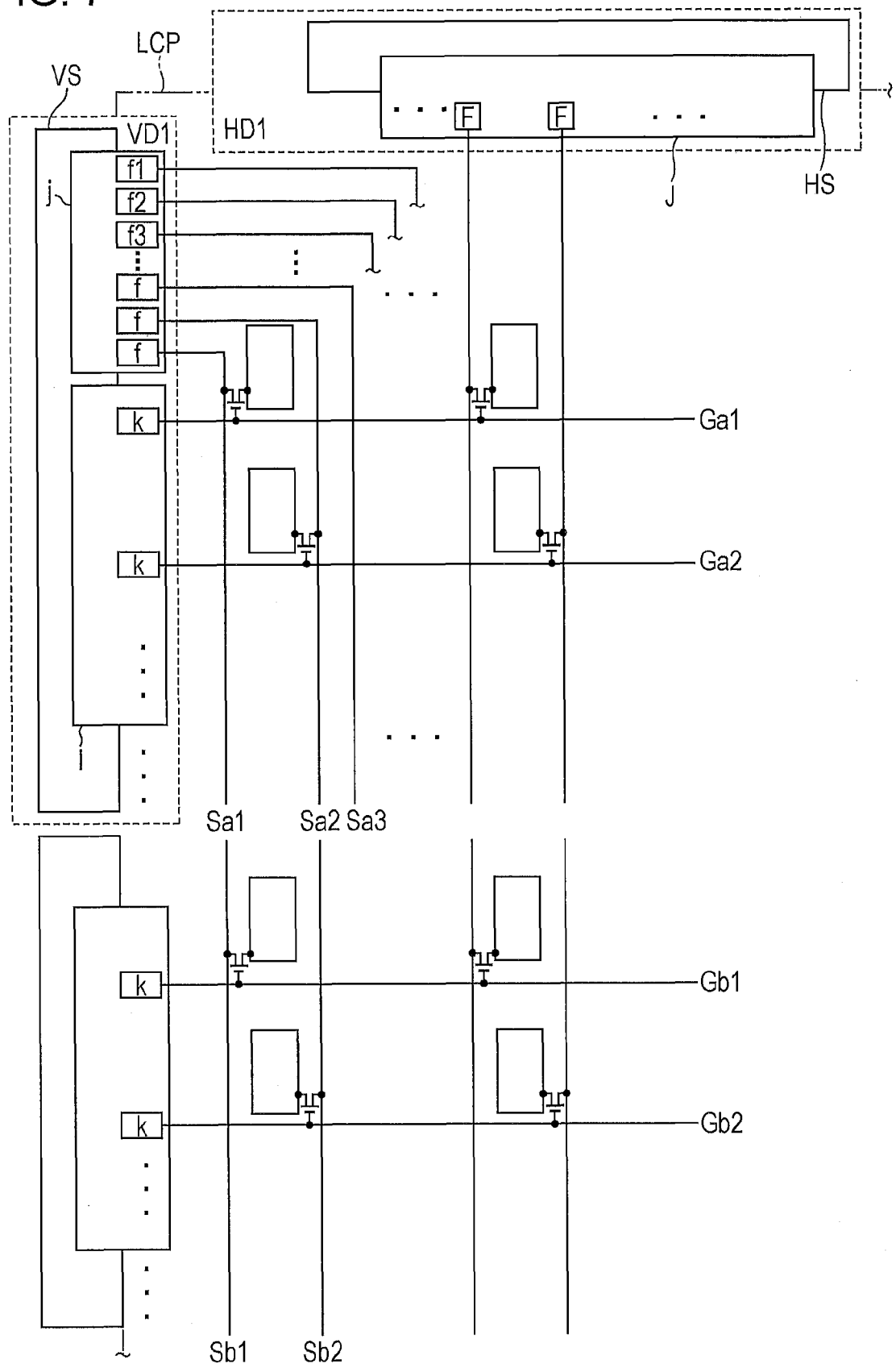
FIG. 7 is an explanatory diagram illustrating a configuration of principal portions in the event that a liquid crystal display device serving as a display device of the present embodiment employs a single pixel format.

With the above embodiments, a case has been illustrated where the liquid crystal display device LCD employs a so-called multi-pixel format wherein one pixel has two pixel electrodes. However, the liquid crystal display device LCD may employ a single pixel format as illustrated in FIG. 7, for example. FIG. 7 is an explanatory diagram illustrating a configuration of principal portions in the event that the liquid crystal display device LCD serving as a display device of the present embodiment employs a single pixel format.

The liquid crystal display device LCD illustrated in FIG. 7 is, except for employing a single pixel format where one pixel has one pixel electrode, the same as the liquid crystal display device LCD illustrated in FIG. 6. Also, with the liquid crystal display device LCD illustrated in FIG. 7, in the same way as with the configuration illustrated in FIG. 3, may have a configuration wherein difference in the line lengths of the data signal lines Sa and Sb is cancelled out by the length adjusting unit 35.

Figure 8:
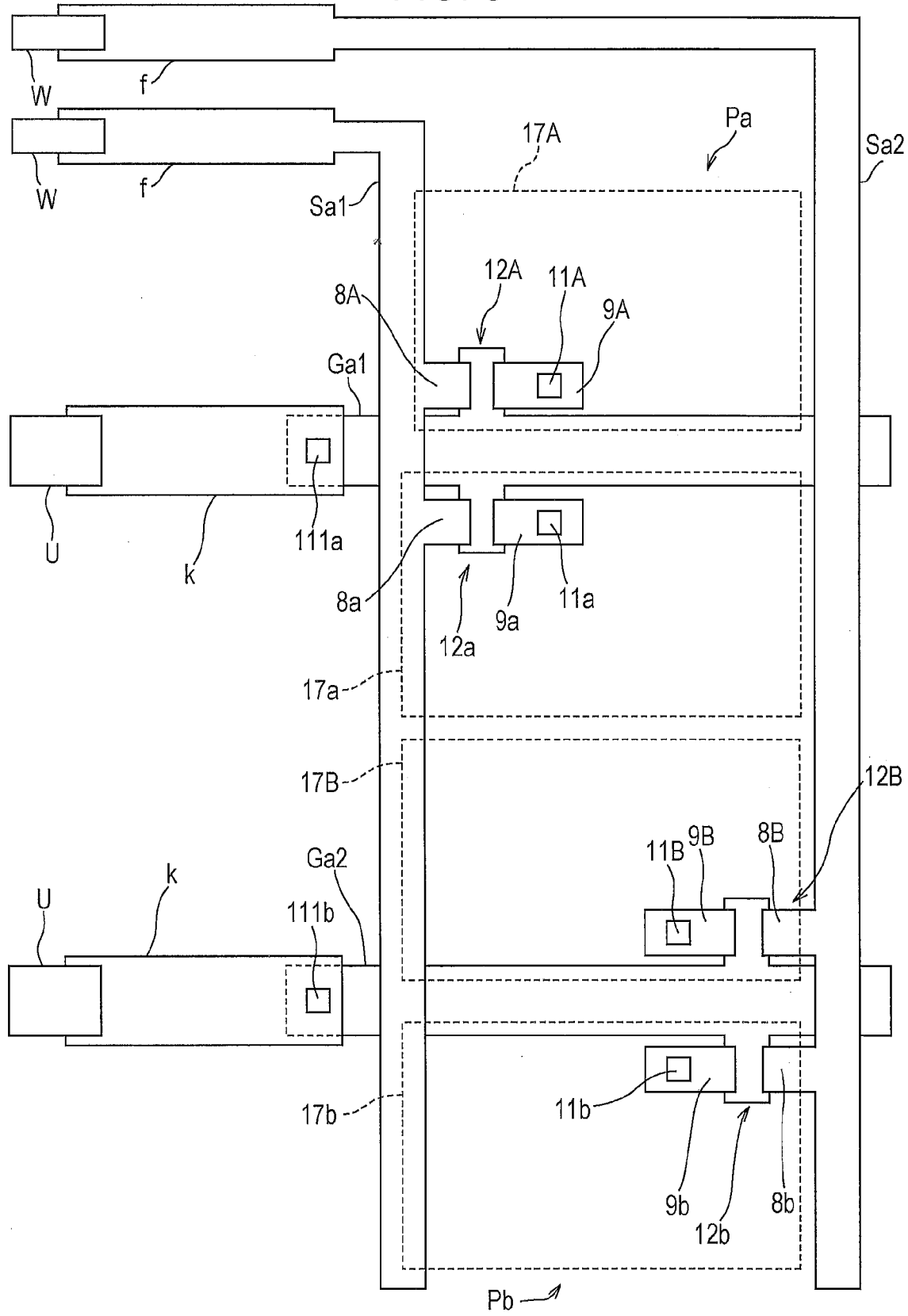
FIG. 8 is a plan view illustrating a configuration of the liquid crystal panel of a multi-pixel format illustrated in FIG. 3 and FIG. 6.

Now, illustration will be made of a configuration of the liquid crystal panel LCP in the multi-pixel format illustrated in FIG. 3 and FIG. 6. FIG. 8 is a plan view illustrating a configuration of the liquid crystal panel LCP in the multi-pixel format illustrated in FIG. 3 and FIG. 6. FIG. 8 illustrates a configuration of the region 36 illustrated in FIG. 3 and FIG. 6. Note however, the length adjusting unit 35 illustrated in FIG. 3 is not illustrated.

In FIG. 8, data signal lines Sa1 and Sat are connected to the vertical-side source terminals f and f respectively, and terminals W and W of the vertical-side source SOF on which the vertical-side source driver chip j is mounted are connected to the vertical-side source terminals f and f. Also, scanning signal lines Ga1 and Gat are connected to gate terminals k and k via contact holes 111a and 111b respectively, terminals U and U of the vertical-side gate SOF on which the gate driver chip 1 is mounted are connected to the gate terminals k and k.

Note that TFTs 12A and 12a include, above a gate electrode, source electrodes 8A and 8a and drain electrodes 9A and 9a connected to a data signal line Sa1, and the drain electrodes 9A and 9a are connected to pixel electrodes 17A and 17a by contact holes 11A and 11a respectively.

Similarly, TFTs 12B and 12b include, above a gate electrode, source electrodes 8B and 8b and drain electrodes 9B and 9b connected to a data signal line Sat, and the drain electrodes 9B and 9b are connected to pixel electrodes 17B and 17b by contact holes 11B and 11b respectively.

With the above embodiments, description has been made with the liquid crystal display device LCD in a so-called vertical dividing double source method for subjecting the liquid crystal panel LCP to vertical dividing driving as an example, but a liquid crystal display device to which the present invention is applied is not restricted to this method. For example, an arrangement may be made wherein, with a configuration wherein a plurality of source driver chips are disposed along the long sides of the liquid crystal panel LCP, and a plurality of gate driver chips are disposed along the short sides of the liquid crystal panel LCP, a part of the plurality of source driver chips are disposed on the short sides of the liquid crystal panel LCP.

Also, the configuration of the present application invention is not restricted to the liquid crystal display device LCD, includes data signal lines and scanning signal lines, and also applicable to a display device including a data signal line driving circuit and a scanning signal line driving circuit.

As described above, an array substrate of the present invention is an array substrate having a first side and a second side which are adjacent to each other, including: a plurality of data signal lines formed so as to extend in a direction parallel to the second side, and also so as to array in a direction perpendicular to the second side; a plurality of second input terminals formed along the second side to which edge portions of a plurality of data signal lines formed in a position on a closer side to the second side of the data signal lines are each connected; and a plurality of first input terminals formed along the first side to which edge portions of a plurality of data signal lines formed in a position on a farther side from the second side are each connected.

According to the above configuration, the plurality of first input terminals connected to the plurality of data signal lines are formed on the first side, and further, the plurality of second input terminals connected to the plurality of data signal lines are formed on the second side. In this manner, input terminals as to data signal lines are formed on the first side and second side which are adjacent to each other, and accordingly, a necessary number of input terminals can be formed in a sure manner, and higher definition can be handled.

With the above array substrate, a length adjusting unit configured to equalize line length with another data signal line is formed in the data signal lines.

With the configuration wherein input terminals as to data signal lines are formed on the first side and second side which are adjacent to each other as the first input terminals and second input terminals, the data signal lines connected to the first input terminals may differ from the data signal lines connected to the second input terminals in line length, for example. In this case, according to difference in line lengths of the data signal lines, voltage to be applied to pixels from the data signal lines may be changed, and desired gradation display may be unobtainable. However, a length adjusting unit configured to equalize line length with another data signal line is formed in the data signal lines, and accordingly, occurrence of a problem such as described above can be prevented.

A display device of the present invention includes: the array substrate including a plurality of scanning signal lines formed so as to extend in a direction perpendicular to the second side and also so as to array in a direction parallel to the second side, and a plurality of third input terminals formed in a position on a farther side from the first side than the positions of the plurality of second input terminals in the second side along the second side to which edge portions of the plurality of scanning signal lines are each connected; a first-side side data signal line driving circuit connected to the first input terminal and disposed along the first side; a second-side side data signal line driving circuit connected to the second input terminal and disposed along the second side; and a scanning signal line driving circuit connected to the third input terminal and disposed along the second side.

According to the above configuration, data signal line driving circuits are disposed along the adjacent first side and second side of the array substrate as the first-side side data signal line driving circuit and second-side side data signal line driving circuit. Thus, along with higher definition of display devices, a necessary number of data signal line driving circuits can be disposed in a sure manner, and higher definition can be handled.

With the above display device, the first-side side data signal line driving circuit and the second-side side data signal line driving circuit are configured of a driving circuit chip for an integrated circuit, and the one or more driving circuit chips are disposed as the second-side side data signal line driving circuit.

According to the above configuration, the data signal line driving circuits are configured of a driving circuit chip for an integrated circuit, and accordingly, a suitable number of driving circuit chips can readily be disposed along the second side of the array substrate as the second-side side data signal line driving circuits.

A display device of the present invention includes: the array substrate including a plurality of scanning signal lines formed so as to extend in a direction perpendicular to the second side and also so as to array in a direction parallel to the second side, and a plurality of third input terminals formed in a position on a farther side from the first side than the positions of the plurality of second input terminals in the second side along the second side to which edge portions of the plurality of scanning signal lines are each connected; a first-side side data signal line driving circuit connected to the first input terminal and disposed along the first side; a second-side side data signal line driving circuit connected to the second input terminal and disposed along the second side; and a scanning signal line driving circuit connected to the third input terminal and disposed along the second side, with at least output voltage from the second-side side data signal line driving circuit being adjusted so that, with the same gradation display, voltage to be applied from a data signal lines connected to the first input terminal to a pixel agrees with voltage to be applied from a data signal line connected to the second input terminal to a pixel.

According to the above configuration, with the same gradation display, at least output voltage from the second-side side data signal line driving circuit is adjusted so that voltage to be applied from a data signal line connected to the first input terminal to a pixel agrees with voltage to be applied from a data signal line connected to the second input terminal to a pixel. Thus, even when line length differs between a data signal line connected to the first input terminal and a data signal line connected to the second input terminal for example, a situation wherein voltage to be applied from a data signal line to a pixel is changed due to difference in line lengths of data signal lines can be prevented, and desired gradation display can be performed.

With the above display device, an arrangement may be made wherein the second-side side data signal line driving circuit is provided to a second-side side first driving circuit substrate, and the scanning signal line driving circuit is provided to a second-side side second driving circuit substrate, and these second-side side first driving circuit substrate and second-side side second driving circuit substrate are provided onto the same substrate.

According to the above configuration, the second-side side first driving circuit substrate and second-side side second driving circuit substrate are provided onto the same substrate, and accordingly, a configuration on the second side of the array substrate in the display device can be simplified.

With the above display device, the second-side side data signal line driving circuit and the scanning signal line driving circuit may be provided onto the same substrate.

According to the above configuration, the second-side side data signal line driving circuit and the scanning signal line driving circuit are provided onto the same substrate, and accordingly, the configuration on the second side of the array substrate in the display device can be simplified.

A liquid crystal panel of the present invention includes the array substrate. Accordingly, the liquid crystal panel can handle higher definition.

A liquid crystal display device of the present invention includes the liquid crystal panel. Accordingly, the liquid crystal display device can handle higher definition.

The present invention is not restricted to the above embodiments, various modifications may be made within the range laid forth in the Claims, and embodiments obtained by combining technology means each disclosed in different embodiments as appropriate are also encompassed in the technical scope of the present invention.

INDUSTRIAL APPLICABILITY

The present invention is suitable for liquid crystal panels, for example.

REFERENCE SIGNS LIST

LCP liquid crystal panel (array substrate)
LCD liquid crystal display device
Sa, Sb data signal line
F horizontal-side source terminal (first input terminal)
f vertical-side source terminal (second input terminal)
k gate terminal (third input terminal)
35 length adjusting unit
Ga to Gd scanning signal line
J horizontal-side source driver chip (first-side side data signal line driving circuit, driving circuit chip)
j vertical-side source driver chip (second-side side data signal line driving circuit, driving circuit chip)
l gate driver chip (scanning signal line driving circuit)
38 vertical-side gate SOF (second-side side second driving circuit substrate)
39 vertical-side source SOF (second-side side first driving circuit substrate)
VS vertical driver substrate (substrate)

The invention claimed is:

1. A display device comprising:
an array substrate having a first side and a second side which are adjacent to each other, the array substrate including:
a plurality of data signal lines extending in a direction parallel to the second side, and arrayed in a direction perpendicular to the second side;
a plurality of second input terminals arranged along the second side to which edge portions of a plurality of data signal lines in a position on a closer side to the second side of the data signal lines are each connected; and
a plurality of first input terminals arranged along the first side to which edge portions of a plurality of data signal lines in a position on a farther side from the second side are each connected;
a plurality of scanning signal lines formed so as to extend in a direction perpendicular to the second side and also so as to array in a direction parallel to the second side, and
a plurality of third input terminals formed in a position on a farther side from the first side than the positions of the plurality of second input terminals in the second side along the second side to which edge portions of the plurality of scanning signal lines are each connected;
a first-side side data signal line driving circuit connected to the first input terminals and disposed along the first side;
a second-side side data signal line driving circuit connected to the second input terminals and disposed along the second side; and
a scanning signal line driving circuit connected to the third input terminals and disposed along the second side.

2. The display device according to claim 1, wherein the first-side side data signal line driving circuit and the second-side side data signal line driving circuit are configured of a driving circuit chip for an integrated circuit, and the one or more driving circuit chips are disposed as the second-side side data signal line driving circuit.

3. A display device according to claim 1, comprising:
a plurality of scanning signal lines formed so as to extend in a direction perpendicular to the second side and also so as to array in a direction parallel to the second side; a plurality of third input terminals formed in a position on a farther side from the first side than the positions of the plurality of second input terminals in the second side along the second side to which edge portions of the plurality of scanning signal lines are each connected; and
a scanning signal line driving circuit connected to the third input terminals and disposed along the second side, wherein at least output voltage from the second-side side data signal line driving circuit is adjusted so that, with the same gradation display, voltage to be applied from a data signal line connected to the first input terminal to a pixel agrees with voltage to be applied from a data signal line connected to the second input terminal to a pixel.

4. The display device according to claim 1, wherein the second-side side data signal line driving circuit is provided to a second-side side first driving circuit substrate, and the scanning signal line driving circuit is provided to a second-side side second driving circuit substrate, and these second-side side first driving circuit substrate and second-side side second driving circuit substrate are provided onto the same substrate.

5. The display device according to claim 1, wherein the second-side side data signal line driving circuit and the scanning signal line driving circuit are provided onto the same substrate.

* * * * *